US012149755B2

(12) United States Patent
Stalioraitis

(10) Patent No.: US 12,149,755 B2
(45) Date of Patent: Nov. 19, 2024

(54) STREAMING PROXY SERVICE

(71) Applicant: Oxylabs, UAB, Vilnius (LT)

(72) Inventor: Giedrius Stalioraitis, Vilnius (LT)

(73) Assignee: Oxylabs, UAB, Vilnius (LT)

( * ) Notice: Subject to any disclaimer, the term of this patent is extended or adjusted under 35 U.S.C. 154(b) by 0 days.

(21) Appl. No.: 17/659,218

(22) Filed: Apr. 14, 2022

(65) Prior Publication Data

US 2023/0336793 A1 Oct. 19, 2023

(51) Int. Cl.
  *H04N 21/222* (2011.01)
  *H04L 9/40* (2022.01)
  *H04L 61/4511* (2022.01)
  *H04L 69/22* (2022.01)

(52) U.S. Cl.
  CPC ....... *H04N 21/222* (2013.01); *H04L 61/4511* (2022.05); *H04L 63/0281* (2013.01); *H04L 69/22* (2013.01)

(58) Field of Classification Search
  CPC .............. H04N 21/222; H04L 61/4511; H04L 63/0281; H04L 69/22
  See application file for complete search history.

(56) References Cited

U.S. PATENT DOCUMENTS

| | | | | |
|---|---|---|---|---|
| 9,930,067 | B1 * | 3/2018 | Johansson | H04L 63/0478 |
| 2013/0275574 | A1 * | 10/2013 | Hugard, IV | H04L 63/20 |
| | | | | 709/224 |
| 2014/0082661 | A1 * | 3/2014 | Krahnstoever | H04N 21/234336 |
| | | | | 725/32 |
| 2017/0126616 | A1 * | 5/2017 | Halley | H04L 61/4552 |
| 2018/0131672 | A1 * | 5/2018 | Ravindranath | H04L 61/255 |
| 2018/0300762 | A1 * | 10/2018 | Nelakonda | G06Q 30/0255 |
| 2019/0379612 | A1 * | 12/2019 | Tiwary | H04L 47/50 |
| 2020/0358857 | A1 * | 11/2020 | Yang | H04L 67/141 |
| 2022/0182398 | A1 * | 6/2022 | St. Pierre | H04L 63/1416 |
| 2022/0200902 | A1 * | 6/2022 | Wang | H04L 45/46 |

\* cited by examiner

*Primary Examiner* — Jefferey F Harold
*Assistant Examiner* — Franklin S Andramuno
(74) *Attorney, Agent, or Firm* — Sterne, Kessler, Goldstein, and Fox PLLC

(57) ABSTRACT

Embodiments disclose a system that allows for improved generation of web requests for scraping that, because of the nature of the requests and time and manner they are sent out, appear more organic, as in human generated, than conventional automated scraping systems. The system then manages how a client request to scrape a target website is made to the site, masking the request in a manner that makes it appear to the Web server as if the request is not generated by an automated system. In this way, by appearing more organic, Web servers may be less likely to block requests from the disclosed system or may take longer to block requests from the disclosed system. By avoiding Web servers blocking requests and extending the lifetime of IP proxies before they are blocked, embodiments can use a limited IP proxy address space more efficiently.

20 Claims, 6 Drawing Sheets

STREAMING PROXY SERVICE

BACKGROUND

Field

This field is generally related to proxy services.

Related Art

A virtual private network (VPN) extends a private network across a public network and enables users to send and receive data across shared or public networks as if their computing devices were directly connected to the private network. The benefits of a VPN include increases in functionality, security, and management of the private network. A VPN is created by establishing a virtual point-to-point connection through the use of dedicated circuits or with tunneling protocols over existing networks.

VPNs allow users to stay secure when using public Wi-Fi hotspots. They can hide a user's IP (Internet Protocol) address. And, they can allow the user to access more internet content and bypass restrictions such as government censorship. For example, many streaming services restrict content available based on the location the request for the content is made from. For example, some content available in the United States may be unavailable in other countries. If the user has a VPN connecting the user's non-US device with a US device, the VPN can make a request to a streaming service appear as if it originated from the US device, allowing the user to access the US-based content. Sometimes video streaming services will attempt to block requests coming from IP addresses known to be associated with a VPN.

A number of VPN protocols and VPN services are available. Available VPN protocols include PPTP (Point-to-Point Tunneling Protocol), Layer 2 Tunnel Protocol (L2TP/IP-Sec), and Internet Key Exchange version 2 (IKEv2).

In computer networking, a proxy server is a server application that acts as an intermediary between a client requesting a resource and the server providing that resource. When a proxy server forwards requests and responses, it generally does not alter the underlying content, but merely forwards requests and responses between a source and a target. When a proxy server forwards the requests, the proxy server changes the request's source IP address, so the web server is not provided with the geographical location of the source.

Proxy servers, however, do more than simply forward web requests. In some instances, proxy servers can act as a firewall, act as a web filter, provide shared network connections, and cache data to speed up common requests. Proxy servers can also provide privacy and can control internet usage of employees and children. Proxies can also be used to bypass certain internet restrictions (e.g., firewalls) and to circumvent geo-based content restrictions. For example, if a client requests content from a webpage located on a webserver in one country, but the client's home country does not allow access to that content, the client can make the request through a proxy server that contacts and retrieves the content, thereby concealing the location of the target server. Proxy servers can also be used for web scraping, data mining, and other similar tasks. A proxy server changes the request's source IP address, so the web server is not provided with the geographical location of the scraper. Using the proxy server makes a request appear more organic and thus ensures that the results from web scraping represents what would actually be presented were a human to make the request from that geographical location.

To interact with a proxy server, the client may transmit data to the proxy server formatted according to a proxy protocol. The HTTP proxy protocol is one example of how the proxy protocol may operate. HTTP operates at the application layer of the network stack (layer 7). In another example, HTTP tunneling may be used, using, for example, the HTTP CONNECT command. In still another example, the proxy may use a SOCKS Internet protocol. While the HTTP proxy protocol operates at the application layer of the OSI (Open Systems Interconnection) model protocol stack, SOCKS may operate at the session layer (layer 5 of the OSI model protocol stack). Other protocols may be available forwarding data at different layers of the network protocol stack.

Proxy servers fall into various types depending on the IP address used to address a web server. A residential IP address is an address from the range specifically designated by the owning party, usually Internet service providers (ISPs), as assigned to private customers. Usually a residential proxy is an IP address linked to a physical device, for example, a mobile phone or desktop computer. However, businesswise, the blocks of residential IP addresses may be bought from the owning proxy service provider by another company directly, in bulk. Mobile IP proxies are a subset of the residential proxy category. A mobile IP proxy is one with an IP address that is obtained from mobile operators. Mobile IP proxies use mobile data, as opposed to a residential proxy that uses broadband ISPs or home Wi-Fi. A datacenter IP proxy is the proxy server assigned with a datacenter IP. Datacenter IPs are IPs owned by companies, not by individuals. The datacenter proxies are typically IP addresses that are not in a natural person's home.

Exit node proxies, or simply exit nodes, are gateways where the traffic hits the Internet. There can be several proxies used to perform a user's request, but the exit node proxy is the final proxy that contacts the target and forwards the information from the target to a user device, perhaps via a previous proxy. There can be several proxies serving the user's request, forming a proxy chain, passing the request through each proxy, with the exit node being the last link in the chain that ultimately passes the request to the target.

Streaming media is multimedia that is delivered and consumed in a continuous manner from a source, with little or no intermediate storage in network elements. Streaming refers to the delivery method of content, rather than the content itself. Video and music streaming have become increasingly popular servers.

Systems and methods are needed for improved access to streaming services.

BRIEF SUMMARY

In an embodiment, a method provides a streaming proxy service. In the method, a proxy protocol request to a target streaming service is received from a virtual private network service provider server and at a front-end proxy server. The proxy protocol request includes an identifier that uniquely identifies a client of the virtual private network service provider that requested the streaming data. The front-end proxy service provider determines whether the identifier is entered in a table mapping respective identifiers to one of a plurality of back-end proxy servers. When the identifier is not entered in the table, a back-end proxy server is selected from a plurality of back-end proxy servers such that the selected back-end proxy server is located in a region of the target streaming service. The proxy protocol request is forwarded to the selected back-end proxy server for forwarding to the target streaming service. An entry is added to the table mapping the received identifier to the selected back-end proxy server such that the subsequent requests from the client are forwarded to the selected back-end proxy server.

In a further embodiment, the identifier in the proxy protocol request is present in the table at the front-end proxy service. When the identifier is entered in the table, a back-end proxy server that is mapped to the identifier in the table is selected. And the proxy protocol request is forwarded to the back-end proxy server mapped to the identifier.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Figure 1:
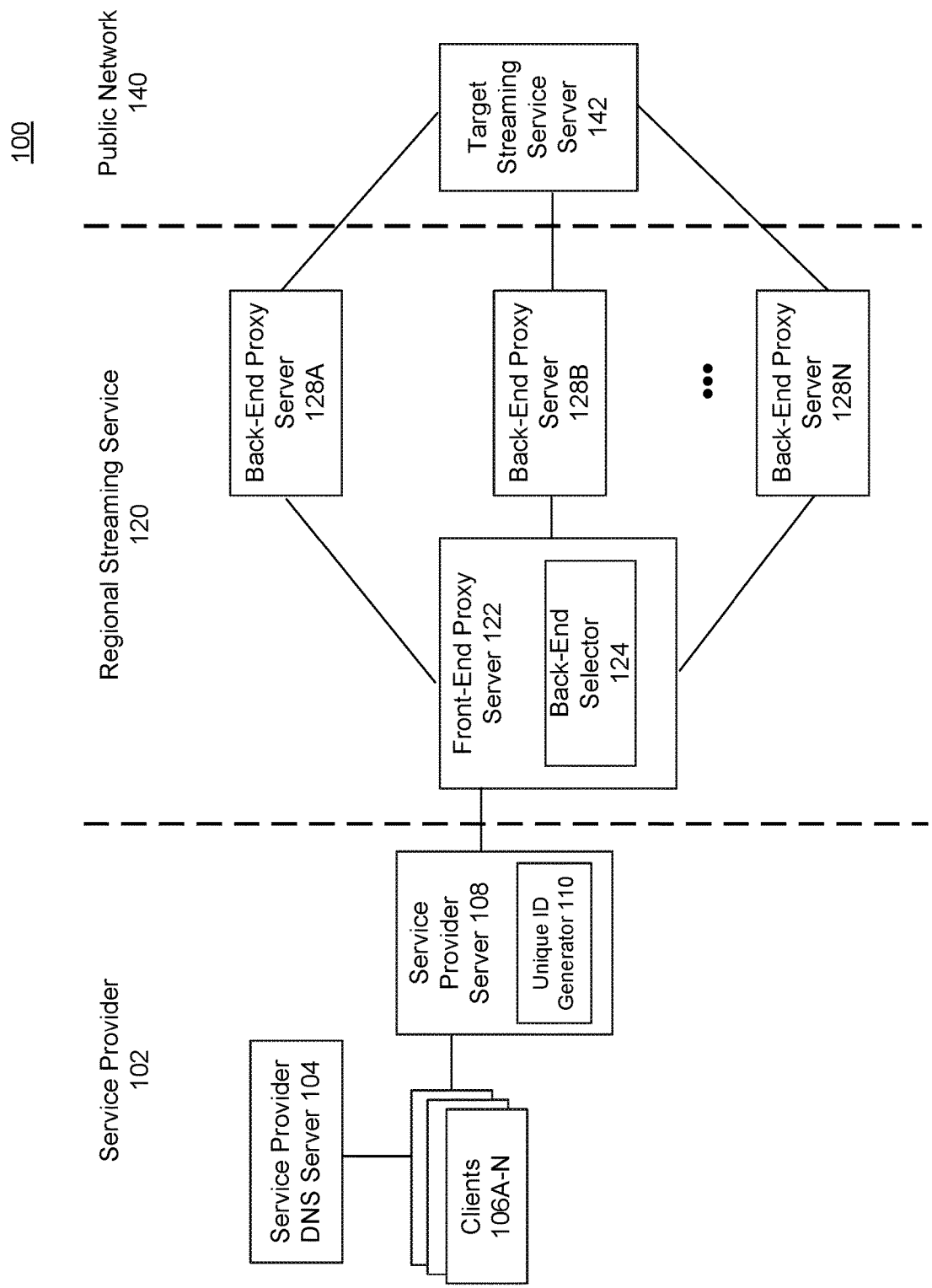
FIG. 1 is an architecture diagram illustrating a system that allows a VPN service provider to stream data through a proxy network.

FIG. 1 is an architecture diagram illustrating a system 100 that allows a VPN service provider to stream data through a proxy network. System 100 includes a service provider 102, regional streaming service 120, and public network 140. Each of these components include one or more computing devices and are connected through one or more networks.

Service provider 102 is a system that provides a VPN or ISP (Internet service provider) service. VPN service provider 102 includes clients 106A-N, service provider DNS server 104, and service provider server 108. As described above, a VPN extends a private network across a public network and enables users to send and receive data across shared or public networks as if their computing devices were directly connected to the private network. VPN service provider 102 creates a VPN by establishing a virtual point-to-point connection between each of the respective clients 106A-N and service provider server 108 through the use of dedicated circuits or with tunneling protocols over existing networks.

Clients 106A-N are computing devices that initiate a request to a target streaming service server 142 through a VPN and includes a VPN client. A VPN client is a typically software-based technology that establishes a secure connection between the respective client 106A-N and service provider server 108. Some VPN clients work in the background automatically, while others have front-end interfaces that allow users to interact with and configure them. VPN clients are often applications that are installed on a computer, though some organizations provide a purpose-built VPN client that is a hardware device pre-installed with VPN software.

As described above, each client computing device 106 may choose to send the request through a VPN to conceal a geographic location of client 106. In one embodiment, client computing device 106 may be from a customer that is a different entity than the entity that controls and manages VPN service provider 102. In another embodiment, client computing device 102 may be controlled by the same entity that controls VPN service provider 102. In this example, VPN service provider 102 may be, for example, a private company offering a VPN to access its corporate network.

Clients 106A-N access service provider DNS server 104 to look up an IP address. When a client 106 sends a message to provider proxy server 108, client 106 may address the message to a DNS address of the target streaming service, such as "video.example.com." Before sending the message to proxy infrastructure 128, client 106 resolves the DNS address into an IP address. Client 106 resolves the DNS address into an IP address by accessing a service provider DNS server 104. The Domain Name System (DNS) is the hierarchical and decentralized naming system used to identify computers, services, and other resources reachable through the internet or other internet protocol networks. The resource records contained in the DNS associate domain names with IP addresses.

Service provider DNS server 104 may resolve "video.example.com," the DNS address of the target, not to the IP address of the target, but to an IP address of service provider server 108. In this way, service provider 102 redirects traffic from clients 106A-N through a proxy network instead of directly to the target streaming service. This may have an effect of concealing aspects (such as an IP address) of clients 106A-N to target streaming service 142.

Service provider server 108 may be a secure remote server that relays data from clients 106A-N safely through the internet using a VPN protocol. As mentioned above, service provider server 108 includes a unique ID generator 110. Service provider server 108 determines the said request is to a streaming service and identifies the desired location of the streaming service. Then, service provider server 108 forwards the request onto a regional streaming service 120 corresponding to the desired location.

When a new request comes from a client 106 to a target streaming service server 142, unique ID generator 110 generates an identifier that uniquely identifies a client of the virtual private network service provider that requested the streaming data. Unique ID generator 110 may be or include software provider to the service provider by the proxy infrastructure. On subsequent requests from the client 106 to target streaming service server provider 142, unique ID generator 110 may retrieve the previously generated ID. Service provider server 108 includes the unique ID in the requests it forwards on to regional streaming service 120.

The request forwarded from service provider server 108 may be formatted as in a proxy protocol. Examples of a proxy protocol include the HTTP proxy protocol and a SOCKS protocol. In another example, HTTP tunneling may be used, using, for example, the HTTP CONNECT command. While the HTTP proxy protocol operates at the application layer of the OSI model protocol stack, SOCKS may operate at the session layer (layer 5 of the OSI model protocol stack). The unique ID generated by unique ID generator 110 may be included in a header of the proxy protocol request send to regional streaming service 120.

Regional streaming service 120 is a network of proxy servers including front-end proxy server 122 and back-end proxy server 128A . . . N. Regional streaming service 120 may service a particular geographic area where streaming content is available and offered by a target streaming service.

Front-end proxy server 122 is configured to receive, from service provider server 108, a proxy protocol request to a target streaming service. As mentioned above, the proxy protocol request includes an identifier that uniquely identifies a client of the virtual private network service provider that requested the streaming data.

Front-end proxy server 122 includes a back-end selector 124 configured to select one of a plurality of back-end proxy severs 128A . . . N. When front-end proxy server 122 has not previously received a request with the identifier, back-end selector 124 selects a server from a plurality of back-end proxy servers 128A . . . N. The selection may be made such that the selected back-end proxy server is located in a geographic region of the target streaming service, forwarding the proxy protocol request to the back-end proxy server in selected in (c) for forwarding to the target streaming service. When front-end proxy server 122 has previously received a request with the identifier, back-end selector 124 selects a server from a plurality of back-end proxy servers 128A . . . N.

Front-end proxy server 122 is configured to forward the request to the selected back-end proxy server 128. Front-end proxy server 122 may format the message to back-end proxy server 128 as a proxy protocol message. The messages may include the identifier. Front-end proxy server 122 may forward the request to the selected back-end proxy server 128 formatted in a proxy protocol. The identifier may be forwarded in a header to the proxy protocol.

The selected back-end proxy server 128 is configured to receive the proxy protocol request with the identifier. Based on the identifier, selected back-end proxy server 128 selects a source IP address to use in its request to target streaming service server 142. If the identifier has been previously received by the selected back-end proxy server 128, the selected back-end proxy server 128 may use the same source IP address it had used previously. Similarly, if the identifier has not been previously received by the selected back-end proxy server 128, the selected back-end proxy server 128 may save the source IP address for use in subsequent requests with the identifier. Back-end proxy server 128 strips the identifier from the proxy protocol request to generate a message with the selected source IP address and a destination IP address of target streaming service server 142. The message may be forwarded on request information from client 106 to target streaming server 142. Back-end proxy server 128 sends the message to target streaming service server 142 via a public network 140, such as the Internet.

Target streaming service server 142 is a multimedia streaming service. Target streaming service server 142 is configured to receive the request and provide a response accordingly. For example, if the request is for media (such as audio and video), target streaming service server 124 begins providing a stream of packets with requested media. Because the source address in the request is for back-end proxy server 128, target streaming service server 142 may have no way of knowing that the request actually originated from a client 106. Any geographic restrictions target streaming server 142 may place on contents it provides would be limited to restrictions in place for the locality of back end proxy server 128, instead of client 106.

Moreover, because a series of requests from the same transaction have the same source address and are from the same back-end proxy server, they may appear more genuine to target streaming service server 142. For example, if target streaming service server 142 received different packets from the same transaction but with different source addresses, target streaming service server 142 may have a hard time even identifying them as belonging to the same communication session. And, even if it could identify the request says it belongs to the same session, target streaming service server 142 may find the request to be suspicious and block them, refusing service. Using a header in the identifier to match incoming requests belonging to the same transaction provides a convenient, efficient, reliable, low overhead way to route client requests routing to same back-end proxy server to use the same source address.

When target streaming service server 142 returns the requested media, the requested media is routed back through the chain of proxy servers—the selected back-end proxy server 128, front-end proxy server 122, service provider server 108, and the client 106 that made the request.

Figure 2:
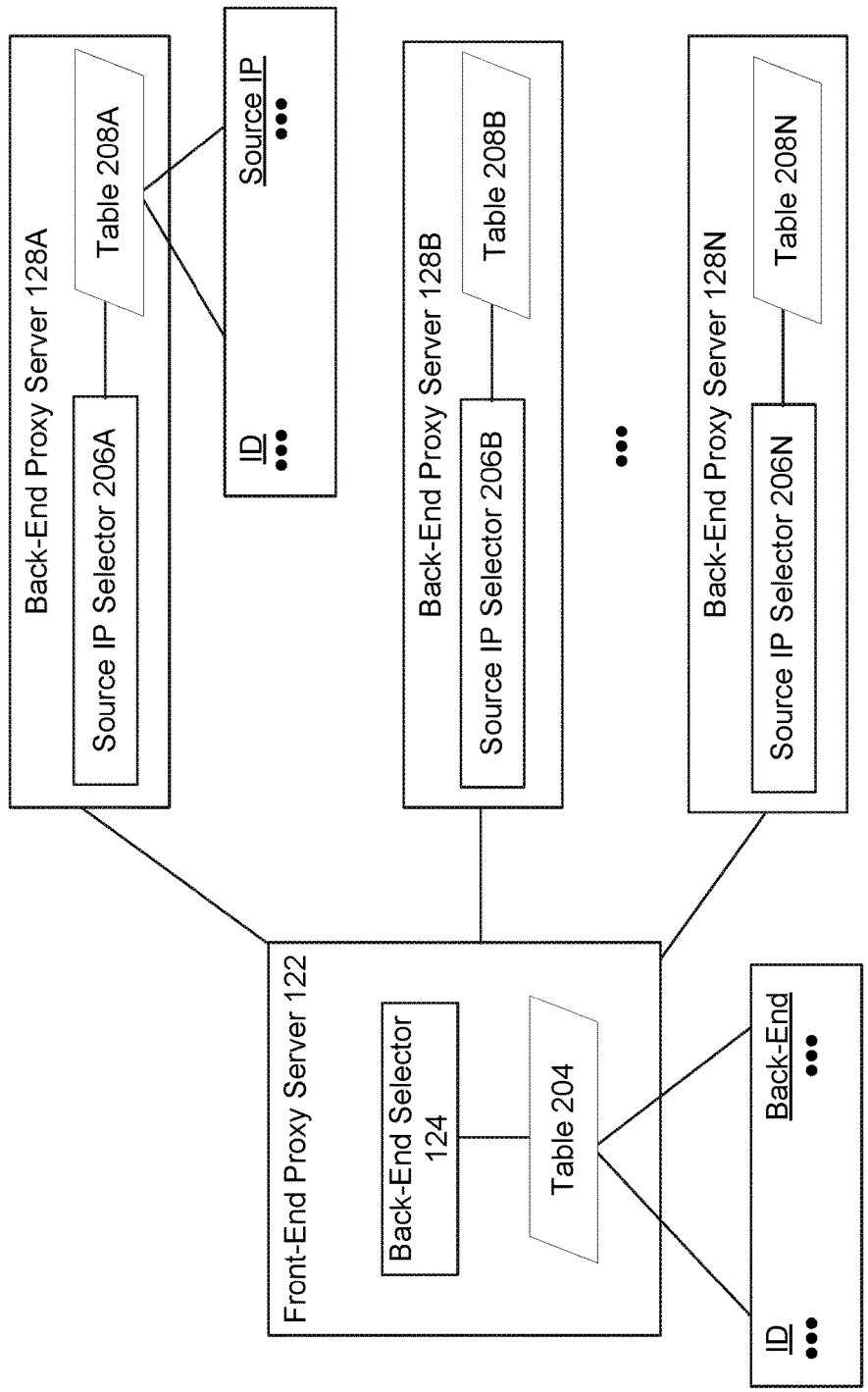
FIG. 2 illustrates aspects of the proxy network in greater detail.

FIG. 2 illustrates regional streaming service 120 in greater detail. As shown in FIG. 2, front-end proxy server 122 includes a table 204 coupled to back-end selector 124. Table 204 maps respective identifiers to one of a plurality of back-end proxy servers. Each entry in table 204 maps an identifier to a back-end proxy server such that the front-end proxy server 122 forwards requests with the identifier from the client to the back-end proxy server. When an identifier from an incoming request is not entered in the table, back-end selector 124 adds an entry to the table mapping the identifier to the back-end proxy that will service the incoming request. Back-end selector 124 may remove entries when they expire after a certain period.

Each back-end proxy server 128A-N includes a respective source IP selector 206A-N and table 208A-N coupled to one another. Each source IP selector 206A-N is configured to select a source IP address to use based on an identifier of an incoming request and the contents of the respective table 208A-N. The source IP address may be periodically or intermediately evaluated to determine whether a target has blocked an IP address and what regional content the target is providing for that IP address. When no IP address is present for the unique ID, source IP selector 206 may select an IP address that is not blocked and is determined to provide the correct regional content.

Table 208 maps respective identifiers to one of a plurality of IP addresses for the respective back-end proxy server. Each entry in table 208 maps an identifier to an IP address such that the back-end proxy server 128 uses the mapped source IP address to forward requests with the identifier. When an identifier from an incoming request is not entered in the table, source IP selector 206 adds an entry to the table mapping the identifier to the source IP address used to forward request. Source IP selector 206 may remove entries when they expire after a certain period.

FIGS. 3A-D illustrate operation of system to provide data to the VPN service provider to stream data through a proxy network.

At step 302, client 106 generates a request for a streaming service. In an example, the request may be for multimedia, such as audio or video. Client 106 may generate the request from a browser or application. The request may be a web request, such as an HTTP request, such as an HTTP request GET request. The request may identify the target server, for example, with an IP address or hostname. In the example where the request is an HTTP request, the request may identify a path, including a hostname, (e.g., "https://video.example.com/stream/"), and other HTTP parameters needed to generate a request.

At step 304, client 106 resolves a DNS address of the target. As mentioned above, to resolve the DNS address the service provider resolves a hostname of a target (e.g., "video.example.com") not to the IP address of the target (e.g., "123.456.789.123") but to a IP address of service provider server 108 (e.g., "192.168.134.143"). DNS address may be for a service provider server 108 at, or corresponding to, a particular geographic location where the desired content is allowed. To resolve the IP address, client 106 may access a DNS server to resolve an IP address corresponding to the DNS address.

At step 306, client 106 transmits the request to VPN service provider server 108. The request may be encapsulated into an IP packet having client 106's IP address as the source address (e.g., "192.168.134.1") and service provider proxy's address as the destination address (e.g., "192.168.134.143"). Continuing the running example, the request packet may be as represented below:
IP 192.168.134.1>192.168.134.143
GET https://video.example.com/stream/HTTP/1.1
Proxy-Authorization: Basic encoded-credentials
Accept: application/x-mpegURL This is only an illustrative example where an HTTP proxy protocol is used for client 106 and 108 to communicate with each other. As described above, the VPN client and server may have other ways to communicate with each other. For simplicity, TCP ports are omitted.

At 308, service provider server 108 receives the proxy protocol request from client 106.

At 310, service provider server 108 generates a unique identifier. The unique identifier at least uniquely identifies the client. It may also uniquely identify the combination of the client and service provider server 108. In an embodiment, client's IP address and VPN server's hostname can be used to generate the unique ID. Both values may be converted to hexadecimal notation and be concatenated with one another.

Continuing the example above, the IP address of client 106 on the VPN is 192.168.134.1. The IP address 192.168.134.1 may be represented in hexadecimal notation as C0A88601. VPN server's short hostname is "debian10," and the hexadecimal representation of the string "debian10" may be 64656269616E3130. The two values may be concatenated with a colon delimiter to form a unique ID: "C0A88601:64656269616E3130".

At 312, service provider server 108 embeds the unique ID in the proxy protocol request. As described above, unique ID may be embedded using a PROXY protocol header. The PROXY protocol provides a way to safely transport connection information such as a client's address across multiple layers of NAT or TCP proxies. It adds a header to every TCP packet with information such as the original client source IP address/port and destination IP address/port. And there is a field, which may be used here to embed the unique ID, to include a unique string. It is designed to require little changes to existing components and to limit the performance impact caused by the processing of the transported information. The "PROXY protocol header" is the block of connection information the connection initiator prepends at the beginning of a connection. The header may start with a signature that indicates use of the protocol.

An example of a request with the unique ID embedded in the PROXY protocol header is below:
PROXY C0A88601:64656269616E3130
GET https://video.example.com/stream/HTTP/1.1
Proxy-Authorization: Basic encoded-credentials
Accept: application/x-mpegURL At 314, service provider server 108 transmits the proxy protocol request to front-end of proxy 122. Continuing the running example, front-end proxy 122 may have the IP address "192.168.134.111," and the packet transmitted may be illustrated as below:
IP 192.168.134.143>192.168.134.111
PROXY C0A88601:64656269616E3130
GET https://video.example.com/stream/HTTP/1.1
Proxy-Authorization: Basic encoded-credentials
Accept: application/x-mpegURL Turning to FIG. 3B, at 316, front-end proxy server 122 receives the proxy protocol request.

At 318, front-end proxy server 122 evaluates the unique ID (in the example above, "C0A88601:64656269616E3130") to determine whether entry for that unique ID is in table 204. When the unique ID is in table 204, operation continues to step 320. Otherwise, operation continues to step 324.

At 320, front-end proxy server 122 selects an available back-end proxy in the desired region. Then at 322, front-end proxy server 122 adds an entry to table 204 mapping the unique ID to the selected back-end proxy. With the back-end proxy selected, operation continues to step 326.

At 324, front-end proxy server 122 selects the back-end proxy mapped to the unique ID in table 204.

At 326, a proxy protocol request to the selected back-end proxy is generated. Suppose that the selected back-end proxy has the IP address "192.168.134.222." Continuing the running example the proxy protocol request would be:
IP 192.168.134.111>192.168.134.222
PROXY C0A88601:64656269616E3130
GET video.example.com/stream HTTP/1.1
Proxy-Authorization: Basic encoded-credentials
Accept: application/x-mpegURL At 328, the generated proxy protocol request is sent to the selected back-end proxy.

Figure 3A:
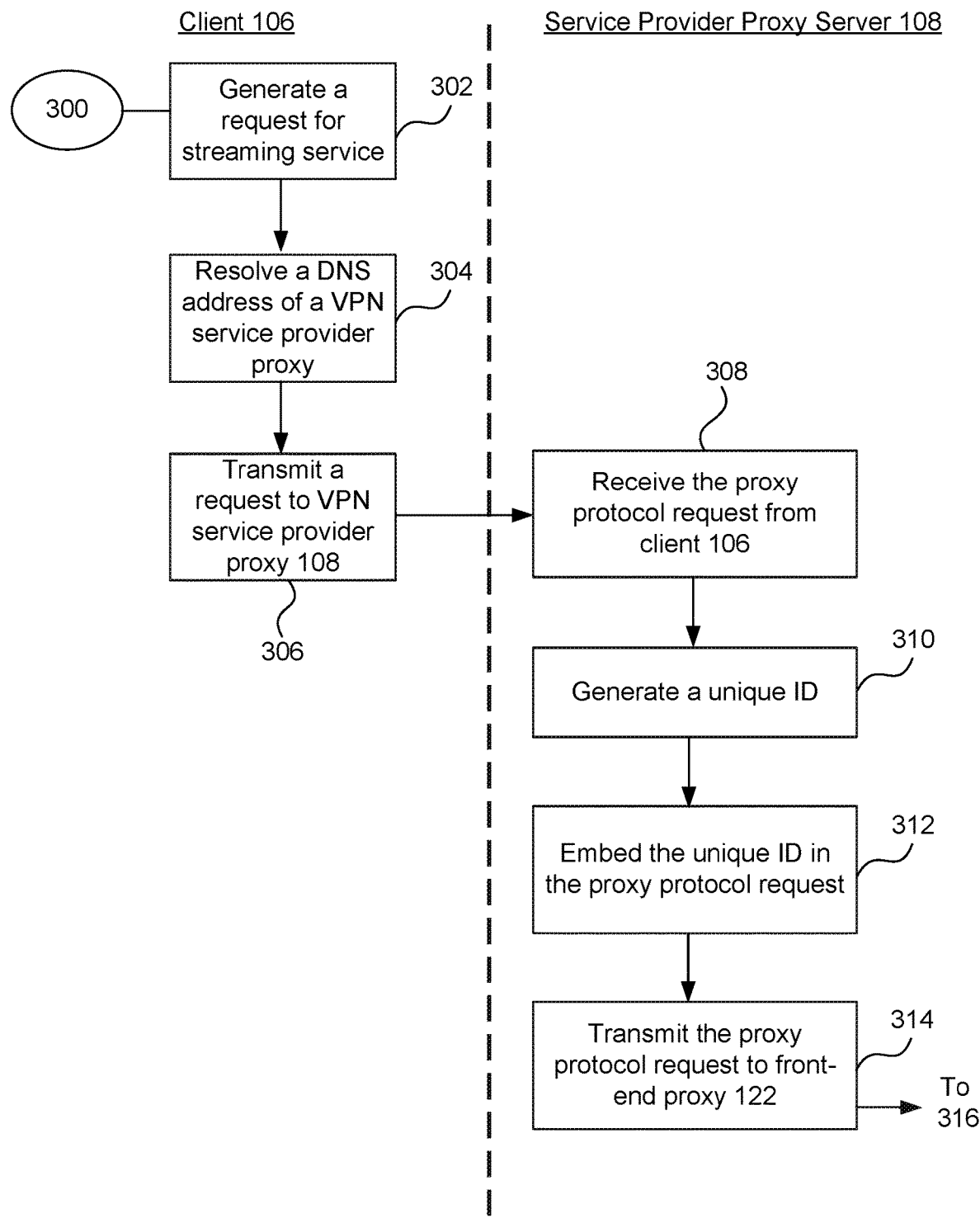
FIGS. 3A-D illustrate operation of system to provide data to the VPN service provider to stream data through a proxy network.
Figure 3B:
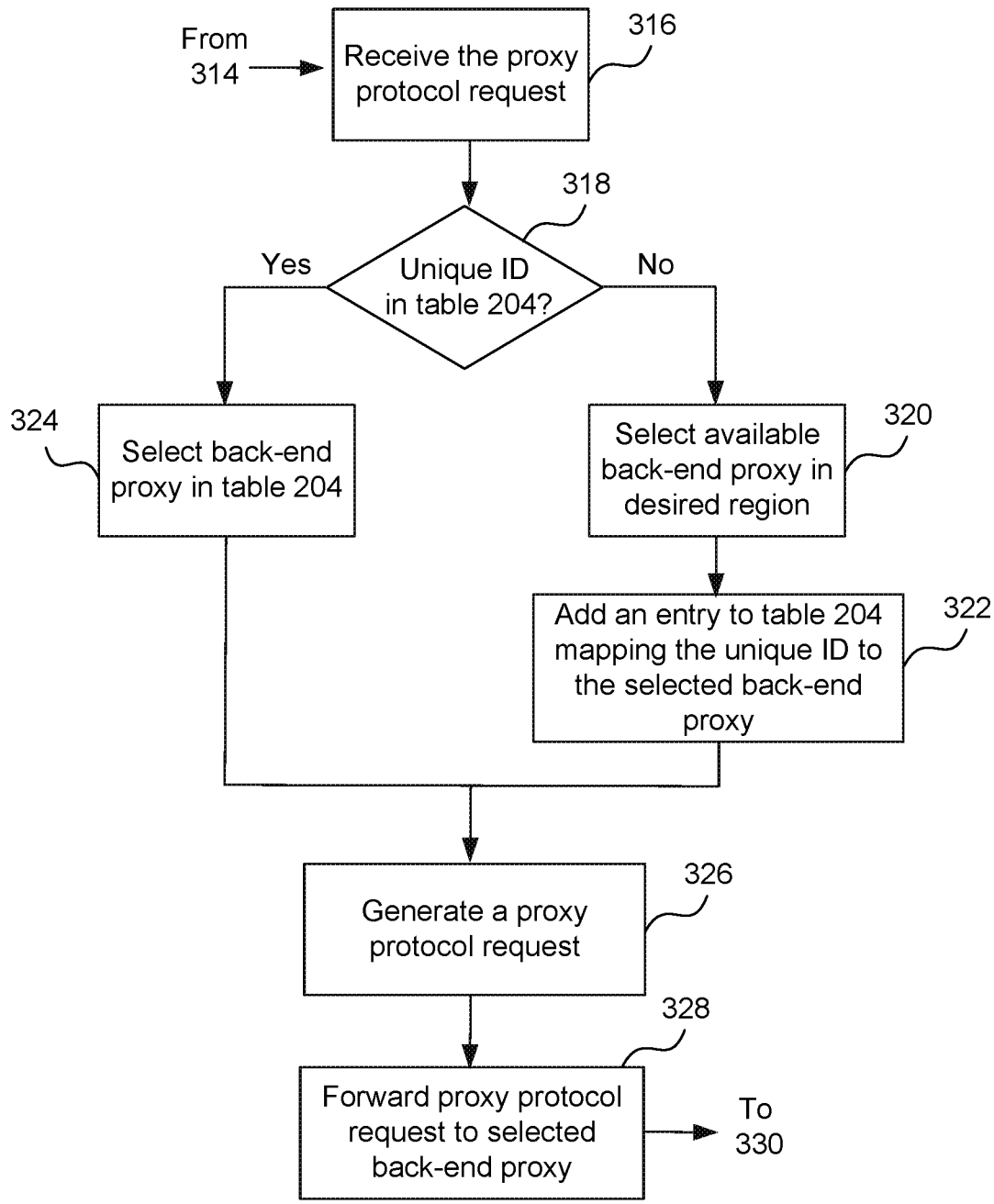
Figure 3C:
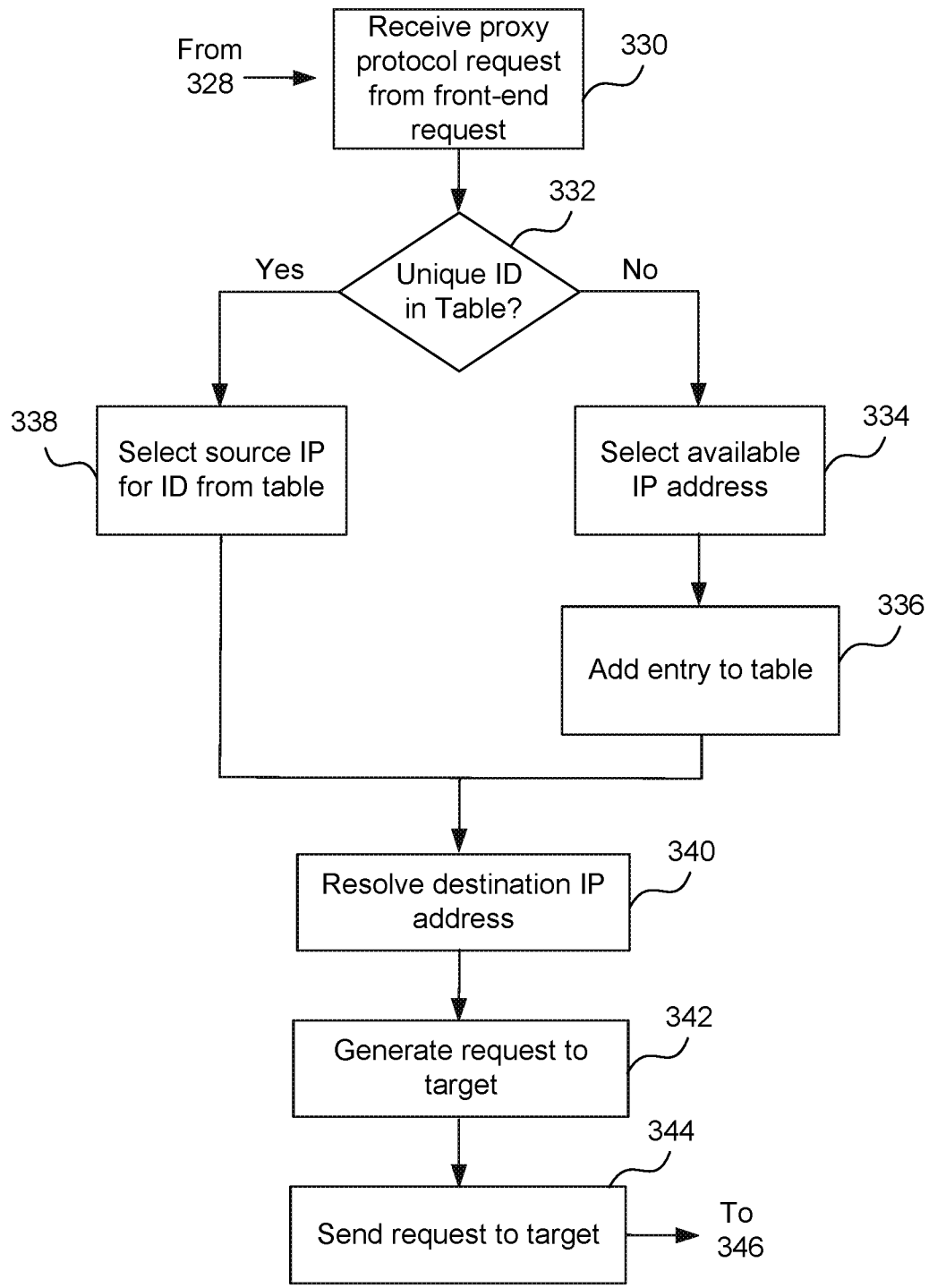

Turning to FIG. 3C, at 330, back-end proxy server 128 evaluates the unique ID (in the example above, "C0A88601:64656269616E3130") to determine whether entry for that unique ID is in table 204. When the unique ID is in table 204, operation continues to step 320. Otherwise, operation continues to step 324.

At 332, back-end proxy server 128 evaluates the unique ID (in the example above, "C0A88601:64656269616E3130") to determine whether an entry for that unique ID is in table 204. When the unique ID is in table 208, operation continues to step 320. Otherwise, operation continues to step 324.

At 334, back-end proxy server 128 selects an available IP address. Then, at 336, back-end proxy server 128 adds an entry to table 208 mapping the unique ID to the selected back-end proxy. With the back-end proxy selected, operation continues to step 340.

At 338, back-end proxy server 128 selects the source IP address mapped to the unique ID in table 208.

At 340, a destination IP address is resolved. If the request is plain HTTP, back-end proxy server 128 extracts the domain name from the Host header. If the request is encrypted HTTPS, back-end proxy server 128 cannot see the request headers, but back-end proxy server 128 can extract the domain name from the TLS SNI header. In the continuing example, the request is plain HTTP, so the target hostname extracted is "video.example.com." An IP address of the target is looked up (e.g., "123.456.789.123")

At 342, a request to the target is generated. Assuming the selected source IP address is 192.168.134.333, continuing the example the request is represented as:

IP 192.168.134.333>123.456.789.123
GET stream/HTTP/1.1
Proxy-Authorization: Basic encoded-credentials
Accept: application/x-mpegURL At 344, the request is transmitted to target streaming service server 142.

Figure 3D:
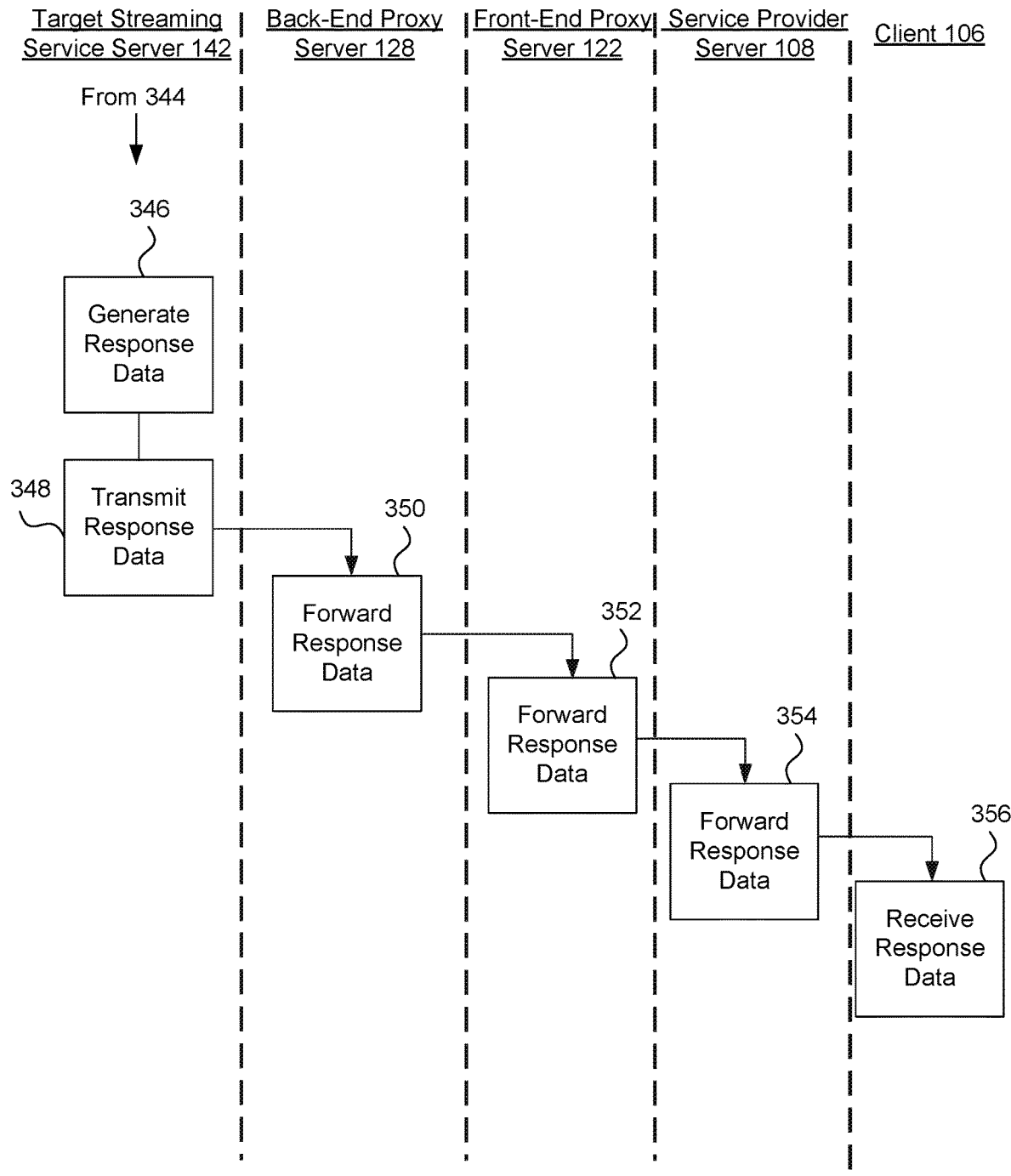

Turning to FIG. 3D, at 346, target streaming service server 142 generates response data based on the request. At 348, target streaming service server 142 transmits the response data, addressing it to the back end proxy server 128. Then, the response data is forwarded back through the proxy chain to client 106. At 350, back-end proxy server 128 forwards the response data to front-end proxy server 122. At 352, front-end proxy server 122 forwards the response data to service provider server 122. At 354, service provider server 122 forwards the response data to client 106. Finally at 356, client 106 receives the response data.

Conclusion

Each of the modules, servers and other components described above may be implemented on software executed on one or more computing devices or different computing devices.

A computing device may include one or more processors (also called central processing units, or CPUs). The processor may be connected to a communication infrastructure or bus. The computer device may also include user input/output device(s), such as monitors, keyboards, pointing devices, etc., which may communicate with communication infrastructure through user input/output interface(s).

One or more of the processors may be a graphics processing units (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer device may also include a main or primary memory 408, such as random access memory (RAM). Main memory 408 may include one or more levels of cache. Main memory 408 may have stored therein control logic (i.e., computer software) and/or data.

The computer device may also include one or more secondary storage devices or memory. The secondary memory may include, for example, a hard disk drive, flash storage and/or a removable storage device or drive.

The computing device may further include a communication or network interface. The communication interface may allow the computer system 400 to communicate and interact with any combination of external devices, external networks, external entities, etc. For example, the communication interface may allow the computer system to access external devices via network 100, which may be wired and/or wireless (or a combination thereof), and which may include any combination of LANs, WANs, the Internet, etc.

The computing device may also be any of a rack computer, server blade, personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer device may access or host any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computing devices may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards. Any of the tables, databases or files described above may be stored in any format, structure, or schema in any type of memory and in a computing device.

In some embodiments, a tangible, non-transitory apparatus or article of manufacture comprising a tangible, non-transitory computer-usable or readable medium having control logic (software) stored thereon may also be referred to herein as a computer program product or program storage device. This includes, but is not limited to, main memory, secondary memory, and removable storage units, as well as tangible articles of manufacture embodying any combination of the foregoing. Such control logic may cause such data processing devices to operate as described herein.

A website is a collection of web pages containing related contents identified by a common domain name and published on at least one web server. A domain name is a series of alphanumeric strings separated by periods, serving as an address for a computer network connection and identifying the owner of the address. Domain names consist of two main elements—the website's name and the domain extension (e.g., .com). Typically, websites are dedicated to a particular type of content or service. A website can contain hyperlinks to several web pages, enabling a visitor to navigate between web pages. Web pages are documents containing specific collections of resources that are displayed in a web browser. A web page's fundamental element is one or more text files written in Hypertext Markup Language (HTML). Each web page in a website is identified by a distinct URL (Uniform Resource Locator). There are many varieties of websites, each providing a particular type of content or service.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such as specific embodiments, without undue experimentation, and without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for providing a streaming proxy service, comprising:
   (a) receiving, from a service provider server and at a front-end proxy server, a proxy protocol request to a target streaming service, the proxy protocol request includes an identifier that uniquely identifies a client of a virtual private network service provider that requested streaming data;
   (b) at front-end proxy service provider, determining whether the identifier is entered in a table mapping respective identifiers to one of a plurality of back-end proxy servers;
   when the identifier is not entered in the table:
   (c) selecting a back-end proxy server from the plurality of back-end proxy servers, wherein the selected back-end proxy server is located in a region of the target streaming service;
   (d) forwarding the proxy protocol request to the back-end proxy server selected in (c) for forwarding to the target streaming service; and
   (e) adding an entry to the table mapping the identifier to the back-end proxy server in (c) such that subsequent requests from the client are forwarded to the back-end proxy server selected in (c).

2. The method of claim 1, further comprising, when the identifier is entered in the table:
   (f) selecting the back-end proxy server mapped to the identifier in the table; and
   (g) forwarding the proxy protocol request to the back-end proxy server selected in (f) for forwarding to the target streaming service.

3. The method of claim 2, wherein the forwarding (g) comprises forwarding the proxy protocol request to include the identifier, and further comprising at the back-end proxy server selected in (f):
   (h) selecting, based on the identifier, a source IP address;
   (i) stripping the identifier from the proxy protocol request to generate a message with the source IP address selected in (h) and a destination IP address of the target streaming service; and
   (j) sending the message to the target streaming service.

4. The method of claim 3, wherein the selecting (h) comprises selecting the source IP address to match what was previously used for the client to access the target streaming service.

5. The method of claim 3, wherein the selecting (h) comprises selecting the source IP address such that only the client uses the source IP address to access the target streaming service.

6. The method of claim 1, further comprising:
   at the back-end proxy server, receiving, from the target streaming service, data requested by the proxy protocol request;
   at the back-end proxy server, forwarding the received data to the front-end proxy server;
   at the front-end proxy server, forwarding the received data to the service provider server to forward onto the client.

7. The method of claim 1, wherein the proxy protocol request includes the identifier embedded in a proxy protocol header.

8. The method of claim 1, wherein the proxy protocol request specifies a web request of a client of the service provider server, further comprising:
   extracting a hostname from a host header or a Transport Layer Security Server Name Indication header of the proxy protocol request;
   resolving an IP address corresponding to the hostname; and
   transmitting the web request to the IP address to request data from the target streaming service.

9. The method of claim 1, wherein the service provider server is a VPN service provider server.

10. The method of claim 1, wherein the proxy protocol request specifies a web request of a client of the service provider server, wherein the client of the service provider server resolves a hostname of the target streaming service using a DNS server of a service provider of the service provider server, wherein the DNS server resolves the hostname of the target streaming service to the service provider server.

11. A non-transitory computer-readable device having instructions stored thereon that, when executed by at least one computing device, cause the at least one computing device to perform operations, comprising:
   (a) receiving, from a service provider server and at a front-end proxy server, a proxy protocol request to a target streaming service, the proxy protocol request includes an identifier that uniquely identifies a client of a virtual private network service provider that requested streaming data;
   (b) at a front-end proxy service provider, determining whether the identifier is entered in a table mapping respective identifiers to one of a plurality of back-end proxy servers;
   when the identifier is not entered in the table:
   (c) selecting a back-end proxy server from the plurality of back-end proxy servers, wherein the selected back-end proxy server is located in a region of the target streaming service;
   (d) forwarding the proxy protocol request to the back-end proxy server selected in (c) for forwarding to the target streaming service; and
   (e) adding an entry to the table mapping the identifier to the back-end proxy server in (c) such that subsequent requests from the client are forwarded to the back-end proxy server selected in (c).

12. The non-transitory computer-readable device of claim 11, the operations further comprising, when the identifier is entered in the table:
(f) selecting the back-end proxy server mapped to the identifier in the table; and
(g) forwarding the proxy protocol request to the back-end proxy server selected in (f) for forwarding to the target streaming service.

13. The non-transitory computer-readable device of claim 12, wherein the forwarding (g) comprises forwarding to the proxy protocol request to include the identifier, and the operations further comprising at the back-end proxy server selected in (f):
(h) selecting, based on the identifier, a source IP address;
(i) stripping the identifier from the proxy protocol request to generate a message with the source IP address selected in (h) and a destination IP address of the target streaming service; and
(j) sending the message to the target streaming service.

14. The non-transitory computer-readable device of claim 13, wherein the selecting (h) comprises selecting the source IP address to match what was previously used for the client to access the target streaming service.

15. The non-transitory computer-readable device of claim 13, wherein the selecting (h) comprises selecting the source IP address such that only the client uses the source IP address to access the target streaming service.

16. The non-transitory computer-readable device of claim 11, the operations further comprising:
at the back-end proxy server, receiving, from the target streaming service, data requested by the proxy protocol request;
at the back-end proxy server, forwarding the received data to the front-end proxy server;
at the front-end proxy server, forwarding the received data to the service provider server to forward onto the client.

17. The non-transitory computer-readable device of claim 11, wherein the proxy protocol request includes the identifier embedded in a proxy protocol header.

18. The non-transitory computer-readable device of claim 11, wherein the proxy protocol request specifies a web request of a client of the service provider server, the operations further comprising:
extracting a hostname from a host header or a Transport Layer Security Server Name Indication header of the proxy protocol request;
resolving an IP address corresponding to the hostname; and
transmitting the web request to the IP address to request data from the target streaming service.

19. The method of claim 11, wherein the service provider server is a VPN service provider server.

20. The method of claim 11, wherein the proxy protocol request specifies a web request of a client of the service provider server, wherein the client of the service provider server resolves a hostname of the target streaming service using a DNS server of a service provider of the service provider server, wherein the DNS server resolves the hostname of the target streaming service to the service provider server.

* * * * *